J. W. STUBBS.
Fertilizers.

No. 136,277.

Patented Feb. 25, 1873.

Witnesses:

Inventor:
J. W. Stubbs
per
Attorneys.

UNITED STATES PATENT OFFICE.

JOHN W. STUBBS, OF CHERAW, SOUTH CAROLINA.

IMPROVEMENT IN FERTILIZERS.

Specification forming part of Letters Patent No. 136,277, dated February 25, 1873.

*To all whom it may concern:*

Figure 1:
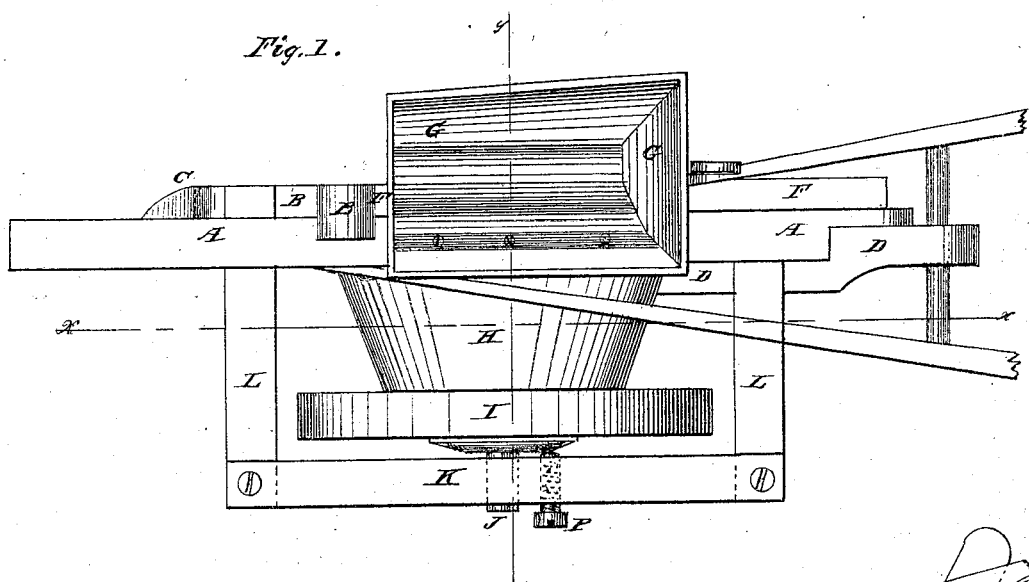
Figure 2:
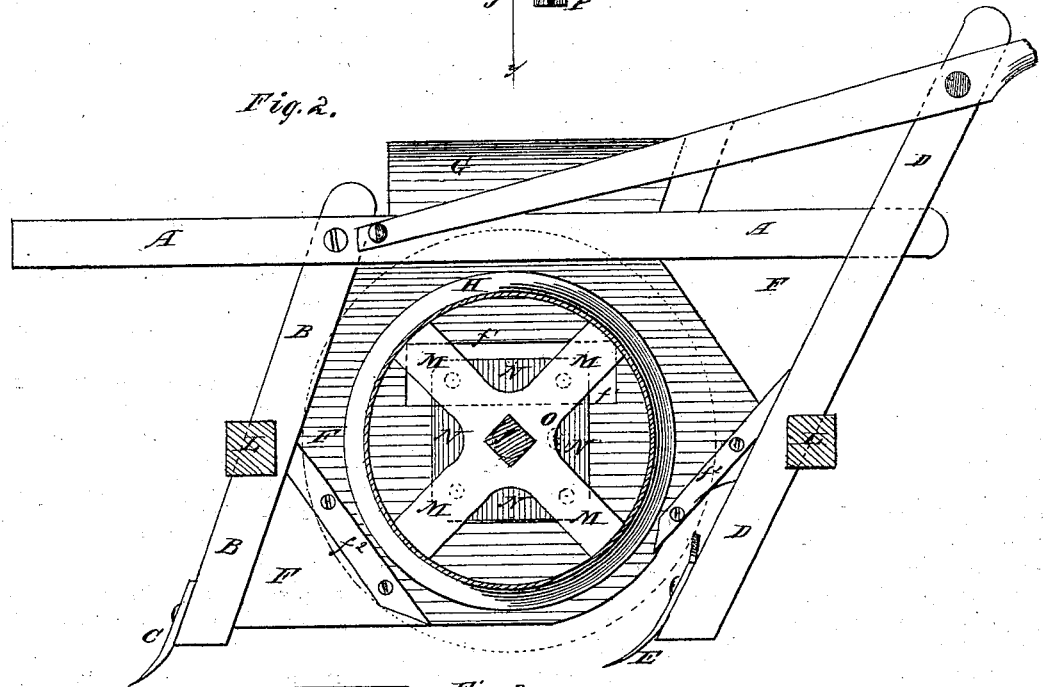
Figure 3:
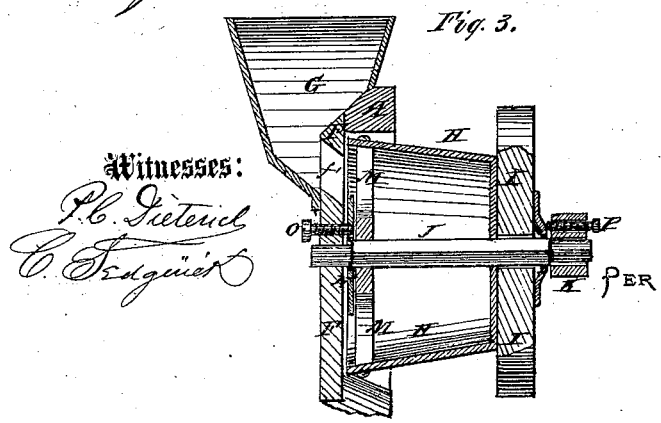

Be it known that I, JOHN W. STUBBS, of Cheraw, in the county of Chesterfield and State of South Carolina, have invented a new and useful Improvement in Guano-Distributer, of which the following is a specification:

Figure 1 is a top view of my improved machine. Fig. 2 is a detail vertical longitudinal section of the same taken through the line $x$ $x$, Fig. 1. Fig. 3 is a detail vertical cross-section of the same taken through the line $y$ $y$, Fig. 1.

Similar letters of reference indicate corresponding parts.

My invention has for its object to furnish an improved machine for distributing guano or other fine fertilizer, which shall be simple in construction, convenient in use, and effective in operation, being so constructed that it may be readily adjusted to distribute more or less of the fertilizer, as may be desired. The invention consists in the combination of the beam, the two plow-standards, the vertical plate having an opening formed through it, the receiving-hopper, the distributing-hopper, the wheel, the shaft and its radial arms with each other, and in the combination of the two adjusting-screws with the vertical plate, the distributing-hopper, the wheel, and its shaft and radial arms, as hereinafter fully described.

A represents a beam, similar to a plow-beam, to the off-side of which, a little in front of its center, is attached a standard, B, to the lower end of which is attached a plow, C, for opening a furrow or trench to receive the guano. To the near side of the rear end of the beam A is attached a standard, D, to the lower end of which is attached a plow, E, for filling up the trench or furrow to cover the guano. To the standards B D and to the beam A between said standards is attached a board or plate, F, extending nearly to the ground, and to which, and to the beam A, is attached a hopper, G, to receive the guano to be distributed.

From the bottom of the hopper G the guano passes through an opening, $f^1$, in the vertical plate F into the distributing-hopper H, which is made in the form of the frustum of a cone, and its smaller and closed end is securely attached to the wheel I, which is rigidly attached to the shaft J. The inner end of the shaft J revolves in bearings in the plate F. The other end of the shaft J revolves in bearings in the bar K, which is placed parallel with the beam A, and the ends of which are secured to the outer ends of the arms L, which are securely attached to the standards B D.

The side of the plate F against which the mouth of the distributing-hopper H bears may be covered with a metallic plate to prevent wear. The mouth of the distributing-hopper H is supported and secured in position by radial arms M attached to the shaft J. To the shaft J and inner part of the arms M is attached a small metallic plate, N, for the forward end of the screw O to rest against to hold the mouth of the hopper H at a greater or less distance from the plate F, according as it is desired to distribute more or less guano. The screw O passes in through a screw-hole in the plate F.

The lower part of the plate F may be slightly concaved to allow the guano to pass out mostly at the lower part of the mouth of the hopper H, and inclined cleats $f^2$ may be attached to the lower part of said plate to collect the guano as it slides down said plate into the furrow.

P is a screw which passes in through a screw-hole in the bar K, and its inner end rests against a plate attached to the outer side of the wheel I.

The screw P is designed to be used in connection with the screw O for adjusting the position of the hopper H to distribute the desired amount of guano.

Having thus described my invention, what I claim as new, and desire to secure by Letters Patent, is—

1. The arrangement of the wheel I and distributing-hopper or cylinder H M on the shaft J with relation to the apertured plate F, having the receiving-hopper G secured to its outer side, as shown and described, to operate as specified.

2. The combination of the two adjusting-screws O P with the plate F, the distributing-hopper H, wheel I, shaft J, and radial arms M, substantially as herein shown and described, and for the purpose set forth.

JOHN W. STUBBS.

Witnesses:
W. L. T. PRINCE,
JOHN F. MATHESON.